United States Patent
Schmidt et al.

(10) Patent No.: US 7,127,506 B1
(45) Date of Patent: *Oct. 24, 2006

(54) PC CONFIGURATION FAULT ANALYSIS

(75) Inventors: Peter H. Schmidt, Lexington, MA (US); Peter J. White, Wellesley, MA (US); David B. Tuttle, Reading, MA (US); Davis Foulger, Wappingers Fall, NY (US); Arthur Mellor, Arlington, MA (US)

(73) Assignee: Teradyne, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/552,105

(22) Filed: Apr. 19, 2000

Related U.S. Application Data

(63) Continuation-in-part of application No. 09/322,107, filed on May 28, 1999, now Pat. No. 6,654,914.

(51) Int. Cl.
*G06F 15/173* (2006.01)

(52) U.S. Cl. .......................... 709/224; 714/41; 714/43; 714/46

(58) Field of Classification Search .............. 709/220, 709/221, 203, 224; 713/201; 714/24, 25, 714/26, 31, 4, 32, 41, 43, 46
See application file for complete search history.

(56) References Cited

U.S. PATENT DOCUMENTS

| | | | |
|---|---|---|---|
| 5,042,027 A | | 8/1991 | Takase et al. |
| 5,163,055 A | * | 11/1992 | Lee et al. ................. 714/748 |
| 5,247,517 A | | 9/1993 | Ross et al. |
| 5,315,580 A | | 5/1994 | Phaal |
| 5,347,524 A | | 9/1994 | L'Anson et al. |
| 5,367,667 A | * | 11/1994 | Wahlquist et al. ............ 714/32 |
| 5,371,883 A | | 12/1994 | Gross et al. |
| 5,377,196 A | | 12/1994 | Godlew et al. |
| 5,459,837 A | | 10/1995 | Caccavale |
| 5,513,314 A | * | 4/1996 | Kandasamy et al. ........... 714/6 |
| 5,586,121 A | | 12/1996 | Moura et al. |
| 5,627,766 A | | 5/1997 | Beaven |
| 5,627,886 A | | 5/1997 | Bowman |
| 5,640,505 A | | 6/1997 | Hearn et al. |
| 5,646,864 A | | 7/1997 | Whitney |
| 5,666,481 A | | 9/1997 | Lewis |

(Continued)

FOREIGN PATENT DOCUMENTS

EP    0 430 708 A2    6/1991

(Continued)

OTHER PUBLICATIONS http://www.c-prompt-dev.com/The_Internet.htm; C:>Prompt:; © 1996, 1997, 1998, 1999; Internet information (7 pgs).

(Continued)

*Primary Examiner*—David Wiley
*Assistant Examiner*—Phuoc H. Nguyen
(74) *Attorney, Agent, or Firm*—Wolf, Greenfield & Sacks, P.C.

(57) ABSTRACT

A diagnostic unit which detects instances of misconfiguration of a subscriber's PC is presented. Many problems experienced by PC subscribers attempting to access a network are related to misconfiguration of the subscriber's PC. The diagnostic unit is able to communicate with the subscriber's misconfigured PC through Fault Tolerant Protocol stacks. The diagnostic unit emulates services such as log-in, authentication, e-mail and the Internet to the subscriber. The diagnostic unit examines the traffic sent by the subscriber to detect instances of misconfiguration and reports the detected configuration of the subscriber's PC.

24 Claims, 3 Drawing Sheets

U.S. PATENT DOCUMENTS

| | | | |
|---|---|---|---|
| 5,696,701 A | | 12/1997 | Burgess et al. |
| 5,732,218 A | | 3/1998 | Bland et al. |
| 5,758,071 A | * | 5/1998 | Burgess et al. ............. 709/220 |
| 5,781,703 A | | 7/1998 | Desai et al. |
| 5,787,253 A | | 7/1998 | McCreery et al. |
| 5,854,889 A | | 12/1998 | Liese et al. |
| 5,862,346 A | | 1/1999 | Kley et al. |
| 5,864,662 A | | 1/1999 | Brownmiller et al. |
| 5,870,540 A | | 2/1999 | Wang et al. |
| 5,870,557 A | | 2/1999 | Bellovin et al. |
| 5,870,559 A | | 2/1999 | Leshem et al. |
| 5,881,237 A | * | 3/1999 | Schwaller et al. .......... 709/224 |
| 5,884,244 A | | 3/1999 | Phaal |
| 5,931,961 A | | 8/1999 | Ranganathan et al. |
| 5,964,891 A | * | 10/1999 | Caswell et al. ............... 714/31 |
| 5,995,956 A | * | 11/1999 | Nguyen ....................... 706/54 |
| 6,031,528 A | | 2/2000 | Langfahl, Jr. |
| 6,049,828 A | | 4/2000 | Dev et al. |
| 6,065,136 A | * | 5/2000 | Kuwabara .................... 714/31 |
| 6,079,020 A | * | 6/2000 | Liu ............................. 713/201 |
| 6,230,287 B1 | * | 5/2001 | Pinard et al. ................. 714/31 |
| 6,269,330 B1 | | 7/2001 | Cidon et al. |
| 6,298,457 B1 | | 10/2001 | Rachlin et al. |
| 6,304,982 B1 | | 10/2001 | Mongan et al. |
| 6,330,597 B1 | * | 12/2001 | Collin et al. ................ 709/220 |
| 6,336,138 B1 | | 1/2002 | Caswell et al. |
| 6,360,332 B1 | | 3/2002 | Weinberg et al. |
| 6,363,053 B1 | | 3/2002 | Schuster et al. |
| 6,393,478 B1 | * | 5/2002 | Bahlmann ................... 709/224 |
| 6,397,359 B1 | | 5/2002 | Chandra et al. |
| 6,496,858 B1 | * | 12/2002 | Frailong et al. ............ 709/221 |
| 6,513,013 B1 | * | 1/2003 | Stephanou ..................... 705/9 |
| 6,529,938 B1 | * | 3/2003 | Cochran et al. ............ 709/203 |
| 6,604,141 B1 | * | 8/2003 | Ventura ...................... 709/227 |
| 6,611,865 B1 | * | 8/2003 | Perugini et al. ............ 709/224 |
| 6,654,914 B1 | * | 11/2003 | Kaffine et al. ................ 714/43 |
| 6,665,820 B1 | * | 12/2003 | Frowein et al. ............... 714/43 |
| 6,757,850 B1 | * | 6/2004 | Lehner ......................... 714/48 |
| 6,785,834 B1 | * | 8/2004 | Chefalas et al. ............... 714/4 |

FOREIGN PATENT DOCUMENTS

| | | |
|---|---|---|
| EP | 0 520 762 A2 | 12/1992 |
| WO | WO 98/26541 | 6/1998 |
| WO | WO 98/44428 | 10/1998 |
| WO | WO 99/34544 | 7/1999 |
| WO | WO9945694 | 9/1999 |
| WO | WO 99/06924 | 11/1999 |

OTHER PUBLICATIONS

Hoffman, Paul; "Working Knowledge: Internet Electronic Mail"; Scientific American, p. 108, (Mar. 1998); (1 pg.).

http://www.ping127001.com/pinage.htm; "The Ping Page—Information about the Ping Utility"; Internet information (3 pgs).

Rickard, Jack; "Mapping The Internet with Traceroute"; http://boardwatch.internet.com/mag/96/dec/bwm38.html; Internetica—Dec. 1996; Internet information (13 pgs.).

http://www.arachnaut.org/wervice/traceroute.htm;. "Courtesy, Arachnaut's Lair"; Unix Traceroute Man p.; Feb. 28, 1989; Internet information (4 pgs.).

ftp://ftp.aces.com/pub/software/traceroute/traceroute.faq: internet information (3 pgs.).

http:///www.tracert.com/explain.html; "Multiple Traceroute Gateway explanations"; © 1998, 1999; Internet information (1 pg.).

http://www.ibm.net.il/traceroute; "Traceroute facility"; internet information (1 pg.).

http:///www.nettoolbox.com/Utilities_Description. html; "Description of Utilities"; Internet information (1 pg.).

http://site.reporter.co.uk/tracefaq.htm; "What is Traceroute?"; © 1998-99; Internet information (1 pg.).

http://wwwtracert.com/; "Multiple traceroute Gateway"; © 1998, 1999; Internet information (1 pg).

http:// www.tracert.com/implement.html; "Internet Service Providers In Europe—Multiple Traceroute"; © 1998, 1999; Internet Information (1 pg.).

http:///www.whatis.com/tracerou.htm; "What Is. . .traceroute (a definition)"; Feb. 19, 1999; Internet information (2 pgs.).

Horneffer M: "Methods for Performance—Analysis of Internet Access Points" Computer Networks and ISDN Systems, North Holland Publishing, Amsterdam, NL, vol. 30, No. 16-18, Sep. 30, 1998 (pp. 1607-1615), XP004138692 ISSN: 0169-7552.

De Albuquerque CVN: Nunes M D; Duarte O C M B: "An Efficient Implementation Architecture for Layered Communication System" 38th Midwest Symposium on Circuits and Systems, Aug. 13-16, 1995, pp. 514-517, XP002181823 Rio de Janeiro, Brazil, the whole document.

* cited by examiner

PC CONFIGURATION FAULT ANALYSIS

RELATED APPLICATIONS

This is a continuation-in-part of U.S. application Ser. No. 09/322,107 filed May 28, 1999, now U.S. Pat. No. 6,654,914.

BACKGROUND OF THE INVENTION

This invention relates generally to networks such as communication and data networks and more particularly to isolating faults in a subscriber's PC configuration as they attempt to access such networks. Communication and data networks are rapidly growing in use and complexity. For example, the number of persons using the Internet to transmit and receive data grows on a daily basis. Also, the persons already using the Internet are increasing their usage as more web sites are added, and as they become increasingly comfortable using more services available on-line such as buying goods, instead of just accessing information. The addition of sources of information and services, such as the ever-increasing number of web sites, increases the complexity of the Internet. As the use and complexity of networks increases, so does the number of problems experienced by subscribers, especially by subscribers who tend to be non-technical in nature.

Network service providers want to reduce the impact of network problems on the subscribers, and the cost of network problems to the service providers. Reducing the impact of problems, such as downtime and inability to access the network or particular information or services in the network, increases the subscribers' desire to use a particular network service provider. Ideally, subscribers never want to have problems with the network. Preferably, they want problems to occur infrequently, and when problems do occur, the subscribers want to have the problem corrected quickly. Reducing the cost to the service provider allows the provider to increase profits and/or services to the subscribers. Costs to the network service providers can be reduced in at least three ways: (1) reducing the cost and time of isolating a problem, (2) reducing the frequency of the problem, and (3) reducing the cost to correct the problem.

One current technique for isolating problems with communication networks is to have the subscriber call a troubleshooting help line or call center. The subscriber calls the help line and describes the subscriber's problem, e.g., what operations the subscriber is unable to perform and what error messages, if any, the subscriber is receiving. A technician analyzes the information provided by the subscriber. The technician can tell the subscriber what the problem is for some problems not requiring tests to diagnose. If diagnosing the problem requires testing, then the technician performs any needed tests on the network. The technician may have to coordinate with other persons, including the subscriber, to perform the needed tests. The technician relays to the subscriber any action that the subscriber needs to take to correct the problem, and/or any information as to what the problem is and how long it will take to correct the problem, either by the subscriber or by the network service provider. Many of the problems a user calls into a call center with are related to the user's PC settings being misconfigured. Some configuration problems may actually isolate the PC from most test tools. The user may be suffering from effects such as an inability to connect, the PC taking a long time to connect, or the user experiencing unreliable connections. It would be desirable to have a device that can communicate with a user's misconfigured PC and determine accurate configuration information relating to the misconfigured PC. This information can then be forwarded to the call center to aid the technician in diagnosing the user's problem. It would be further desirable to have the problem corrected in a minimal amount of time, and with minimal action required by the user.

SUMMARY OF THE INVENTION

With the foregoing background in mind, it is an object of the present invention to provide an apparatus and method for diagnosing a problem experienced by a subscriber interacting with the network. Further, this is accomplished without requiring an application resident on the subscriber's PC. When the subscriber experiences a network problem, the subscriber connects to a Diagnostic Unit (DU). Data is transferred between the DU and the subscriber, with the DU utilizing Fault Tolerant Protocol stacks in order to communicate with the misconfigured subscriber. By way of the communications with the subscriber, the DU determines the subscriber's configuration and provides this information to a network call center application or database. The call center technician utilizes this information as an aid in diagnosis of the user's problem. In general, in another aspect, the invention provides a computer program including instructions for causing the DU to: accept data from a source in a source protocol inconsistent with a network element protocol of a selected network element; establish a communication link with the source; and send an indication of the data received from the source to a selected network element in a protocol consistent with the network element protocol.

BRIEF DESCRIPTION OF THE DRAWINGS

The invention will be better understood by reference to the following more detailed description and accompanying drawings in which.

DESCRIPTION OF THE PREFERRED EMBODIMENT

The presently disclosed method and apparatus provides for improved fault isolation and fault reduction. Many of the calls to an Internet Service Provider (ISP) technical support line or call center are from subscribers having trouble accessing a network or accessing a particular site on a network. Many of these problems are caused by the subscriber's PC being misconfigured. The presently disclosed method and apparatus includes the utilization of a Diagnostic Unit (DU) which can communicate with the subscriber to determine a problem or symptom experienced by the subscriber. Through communications with the subscriber the DU can determine the configuration information of the subscriber. The DU can then forward this information to a third party such as the network service provider for further diagnosis.

Figure 1:
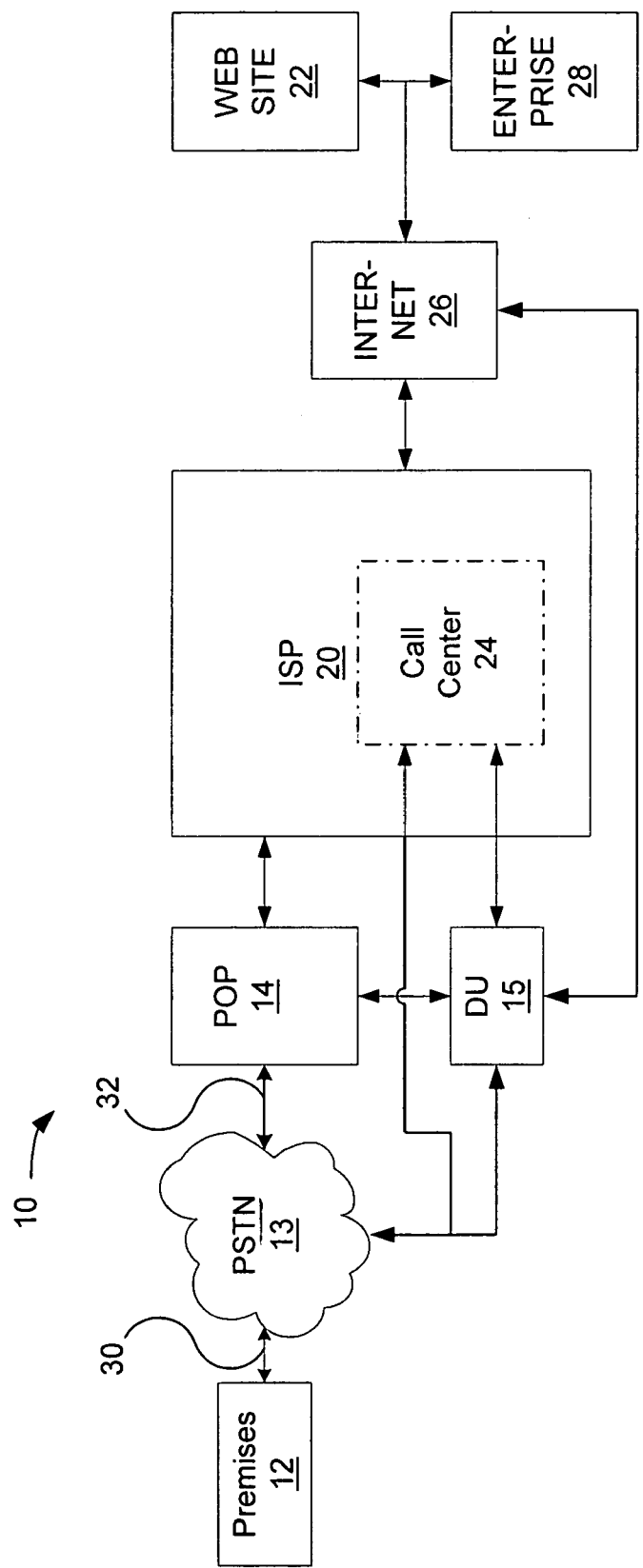
FIG. 1 is a block diagram of a network including the fault analysis system of the present invention.

Referring now to FIG. 1, a communications or data network 10 is shown. The network 10 includes a customer premises 12, a Public Switched Telephone Network (PSTN) 13, a Point of Presence (POP) 14, a Diagnostic Unit 15, an Internet Service Provider (ISP) 20, a call center 24, the Internet 26, an enterprise 28 and a web site 22.

The customer premises 12 include a variety of possibilities for subscribers' terminals to connect to local loop 30. For example, a personal computer (PC) may connect through an analog modem to a telephone line that connects to a line in the local loop 30. While the use of a PC at the user's premises is described, it should be appreciated that devices such as a Palm Pilot, cellular phone or other non-PC devices could also be utilized by the subscriber. The presently disclosed method and apparatus is able to handle such diverse user devices since the present invention does not include an application that must be resident on the user's PC. A PC may connect through Network Termination Equipment (NTE) to a telephone line in the local loop 30 or through an ISDN connection. A subscriber interface device that includes a PC, a phone, and video capabilities, may connect to a Service Hub (SH), that is an integrated on-demand network, that connects to a line in the local loop 30. A PC may connect to a Digital Subscriber Line (DSL) modem. The modem and a phone are coupled to a line in the local loop 30 through a multiplexer. The lines in the local loop are the connections, typically pairs of copper wires, between the subscriber, e.g., the subscribers' home or place of business, and the local telephone company. As used herein, the term "subscriber" can indicate the person interacting with the network 10 and/or the device(s), e.g., a PC, that the subscriber uses to interact with the network 10. The local loop lines are part of the Public Switched Telephone Network (PSTN) 13. The PSTN 13 provides communication between the premises 12 and the POP 14.

The ISP 20 provides for communication to and from the POP 14 and the Internet 26. While an ISP 20 is shown, the present invention could also be used in a non-ISP environment, for example a subscriber attempting to dial in to a company network from home. The Internet 24 is the well-known international communication network of networks providing electronic communication links between, e.g., computer systems. The Internet 26 connects to an enterprise 28 or website 22 to form a link between the subscriber and the enterprise 28 or website 22 The link allows information from the subscriber to be passed to the enterprise 28 or website 22, and information from the enterprise or website to pass to the subscriber. In a working environment the subscriber at the subscriber premises 12 is able to communicate with the desired enterprise 28 or website 22 through the PSTN 13, the POP 14, the ISP 20, and the Internet 26.

The Diagnostic Unit (DU) 15 comprises hardware such as a computer with associated software programs. The DU of the present invention is related to the Internet Diagnostic Unit disclosed in commonly owned patent application Ser. No. 09/322,107, filed May 28, 1999, the disclosure of which is incorporated by reference herein. The software programs include instructions for directing the hardware to perform functions to help capture the configuration information of the subscriber, even if the configuration information is incorrect for the subscriber. The subscriber can communicate with the DU independent of the other portions of the network 10. The DU further contains software for implementing Fault Tolerant Protocol stacks. The Fault Tolerant Protocol stacks allow the DU to establish communications with the subscriber even if the subscriber is attempting to communicate with the network using an improper protocol or configuration. The DU can communicate with subscribers that are supplying a protocol or protocol element that is inconsistent with a protocol of an element of the network with which the subscriber wants to communicate.

The Fault Tolerant Protocol stacks allow communication with an improperly configured subscriber by adapting to the subscriber's protocol or configuration. Using the Fault Tolerant Protocol stack, a DU adapts to the subscriber's setup to allow connections to be made and communication to proceed between the subscriber and the DU. Protocols include indications of transaction steps, data format, and data, e.g., an Internet Protocol (IP) address. Thus, for example, during Internet Protocol Control Protocol (IPCP) negotiations the DU can accept an IP address if the subscriber insists on one, or can assign an IP address if the subscriber does not insist on one. The DU also logs information about the subscriber's behavior and/or setup. By communication with the subscriber and the remainder of the network, the DU 15 can serve as a network access server, at least during diagnosis of network problems.

Figure 2:
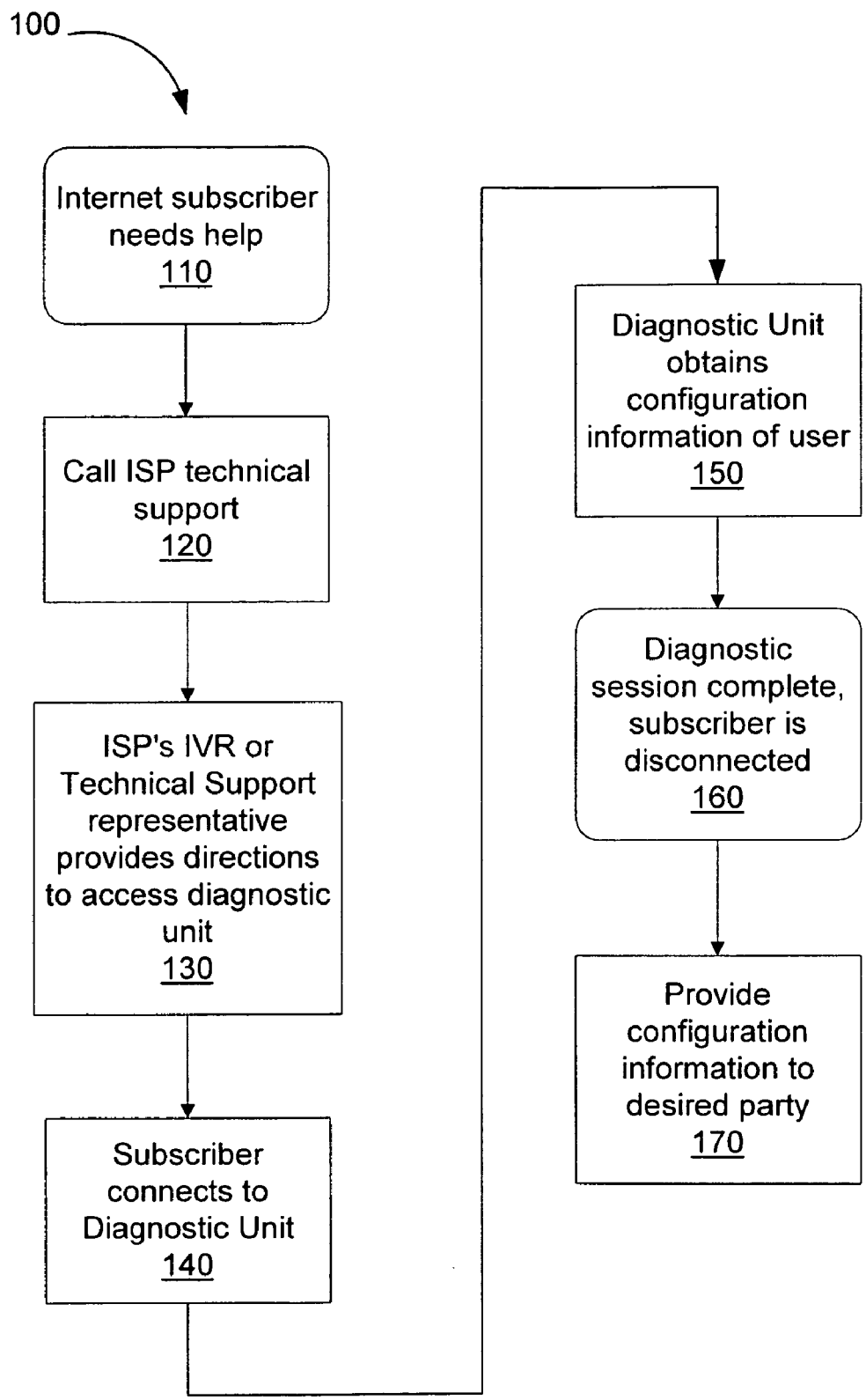
FIG. 2 is a flow chart of a first method of analyzing a configuration of a subscriber.

Referring now to FIG. 2, a flow chart of a method 100 of the present invention is shown. At a first step 110 the subscriber has determined that help is needed. For example, the subscriber may be attempting to connect to a POP, a web site or other enterprise and continuously failing to access the desired POP, web site or enterprise.

At the next step, step 120, the subscriber calls the ISP help desk or call center. The ISP call center is generally the first place the subscriber will call, regardless of where the fault may lie. Alternately, the subscriber may call the DU directly, skipping forward to step 140. When the subscriber calls the ISP call center, the subscriber may be placed into the ISP Interactive Voice Response/Automatic Call Distribution (IVR/ACD) system where the subscriber can select the option of connecting to the diagnostic unit without speaking with a technical support person. Alternately, a technician at the help desk talks with the subscriber in an attempt to resolve the problem the subscriber is experiencing. To assist with the isolation and resolution of the problem the technician instructs the subscriber to call a diagnostic number, as shown in step 130.

At step 140, the subscriber dials the number or otherwise connects to the DU as instructed. The DU answers the subscriber's call such that appropriate actions can take place to establish communication between the subscriber and the DU.

At step 150 the DU obtains configuration information of the subscriber. For example, appropriate modem training and Point to Point Protocol (PPP) negotiating, with corresponding data logging and analysis, occurs until the subscriber and the DU can communicate. If the subscriber cannot access the DU, then the technician can perform a guided diagnostic session to diagnose a fault or faults causing the subscriber's problem(s). Some faults may not be able to be isolated using this guided session. For example, problems relating to connectivity to a POP may not be diagnosable due to the subscriber's inability to connect to the DU. If the subscriber was locked to an X2 protocol and the subscriber's call was answered by a standard NAS that only supported KFlex, V.90, and slower protocols, then the connection between the NAS and the subscriber may fail. The Fault Tolerant Protocol stacks of the DU, however, are able to communicate with a wide variety of protocols in order to negotiate a compatible protocol between the DU and the subscriber. Also, the DU and the subscriber negotiate a Link Control Protocol (LCP). Again, if a standard NAS is used in place of the DU, this negotiation may fail, e.g., if the subscriber's PPP requires Password Authentication Protocol (PAP) while the NAS may only allow CHAP. The DU, however, will allow many options to accommodate different subscriber requirements.

As shown at step 160, after communication between the subscriber and the DU has been established and the appropriate configuration information obtained, the DU disconnects from the subscriber. At step 170 the configuration information obtained in step 150 is forwarded to the call center, to the subscriber, or to both. The configuration information can be forwarded to the appropriate party by any conventional manner, for example by e-mail.

The ISP call center typically includes a trouble ticket system for managing incoming calls from subscribers reporting problems. When a subscriber calls in to the network service provider's call center the subscriber is entered into the system and assigned a trouble ticket for tracking the subscriber through the call center's procedure for correcting the subscriber's problem. After the DU has acquired the subscriber's configuration information, the DU forwards the configuration information to the call center and preferably directly into the trouble ticket system. Additionally, since the subscriber has already taken steps to help resolve the problem by communicating with the DU, the subscriber's call may be prioritized in the system, in order to most quickly and efficiently correct the subscriber's problem.

Figure 3:
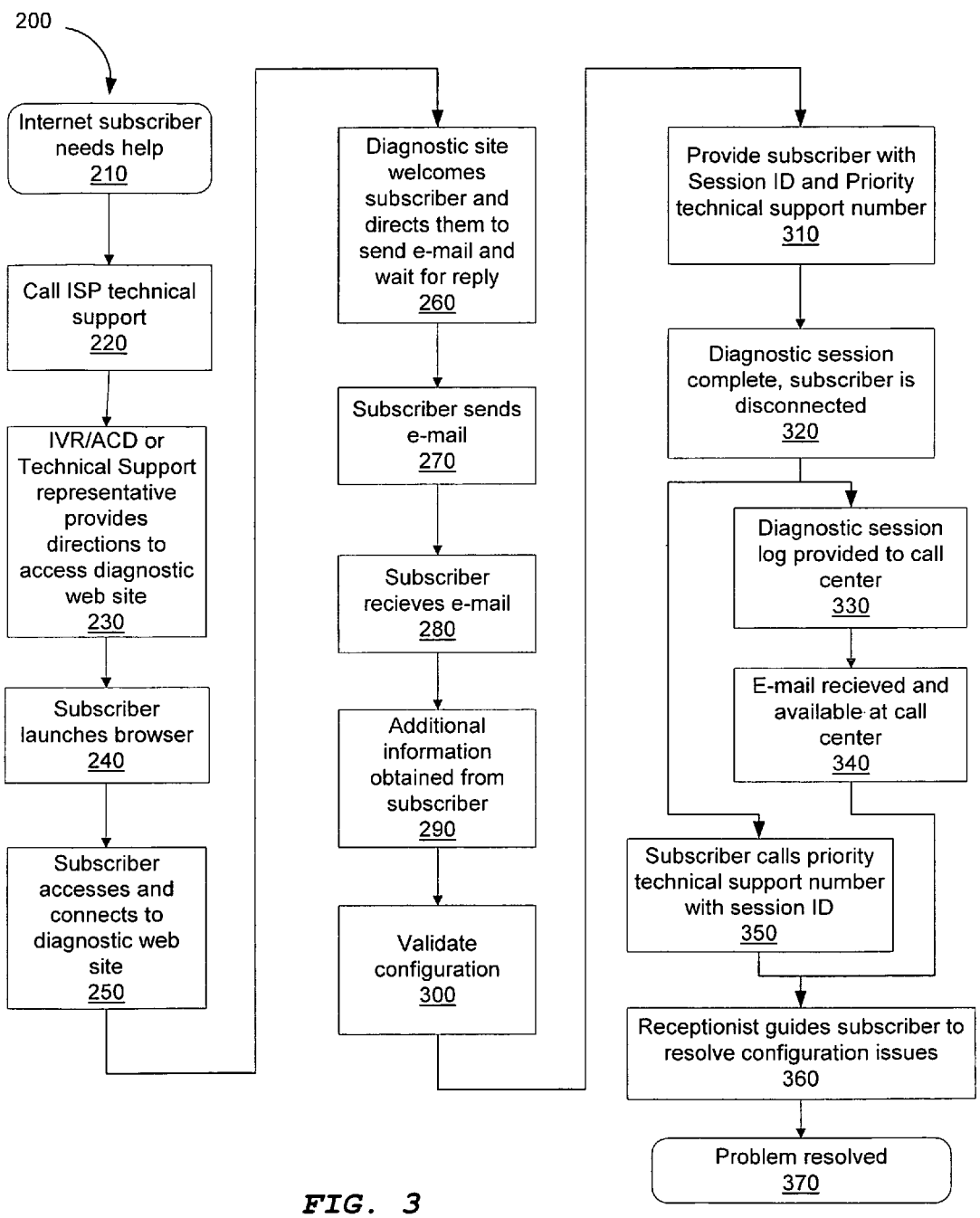
FIG. 3 is a flow chart of a second method of analyzing a configuration of a subscriber.

Referring now to FIG. 3 a similar method 200 is shown but includes providing Internet access for a subscriber experiencing network problems. At step 210 the subscriber has determined that help is needed. For example, the subscriber may be attempting to connect to a web site and continuously failing to access the desired web site.

At the next step, step 220, the subscriber calls the ISP help desk or call center. The subscriber may be placed into the ISP IVR/ACD system where the subscriber can select the option of connecting to the diagnostic unit without speaking with a technical support person. Alternately, the subscriber can elect to speak with an operator at the help desk. The operator talks with the subscriber in an attempt to resolve the problem the subscriber is experiencing. As shown in step 230, to assist with the isolation and resolution of the problem the operator instructs the subscriber to call the diagnostic number to connect to a Diagnostic Web site.

At step 240, the subscriber dials and connects to the diagnostic web site as instructed. The DU provides access for the subscriber to the diagnostic web site. During this step DU-to-subscriber authentication ("Out") and DU-to-ISP Net authentication ("In") occurs. The DU looks out toward the subscriber to authenticate the subscriber's password for use with the DU. Data are logged and analyzed. Additionally, the DU looks in to the network 10 (FIG. 1) toward the ISP Net 20 to authenticate the password supplied by and captured from the subscriber for use with the ISP Net 22. IPCP negotiating occurs between the DU and the subscriber, and data are logged and analyzed (e.g., an Internet Protocol address/netmask is assigned). If a standard NAS is used instead of the DU, then this negotiation may fail, e.g., if the subscriber's IP stack is configured for static IP and the NAS is configured for dynamic allocation. The Fault Tolerant Protocol stacks of the DU, however, can allow for different IP addresses to support (and detect) misconfigured subscribers to help ensure that the negotiation succeeds.

At step 250 the subscriber launches the subscriber's browser, e.g., an Internet browser. The browser, DU, and subscriber enter into a series of transactions to establish communication between the subscriber and the DU. For example, the subscriber's browser sends a DNS request to the DU, which responds to the browser with a DNS response. While a system with a standard NAS may fail if the subscriber uses an improper DNS server, or the DNS server is down, the Fault Tolerant DU is able to provide DNS service. The browser sends a Hypertext Transfer Protocol (HTTP) request to the DU, which responds to the browser with an HTTP response, forwarding the browser to a canonical URL (e.g., http://www.diag.com/Start/). The browser sends a DNS request for the canonical URL and the DU sends a DNS response for the canonical URL to the browser. The browser establishes a Transmission Control Protocol (TCP) connection with the DU and sends an HTTP request to the DU for the canonical URL. The DU forwards the HTTP request to the subscriber link, which sends an HTTP response of an initial subscriber link page to the DU. Next the DU forwards the HTTP response to the browser; e.g., to display a diagnostic web page on the subscriber's terminal. The subscriber may also be requested to input information such as name, phone number, etc., for confirmation that the subscriber has been correctly identified.

At step 260, the subscriber is directed to send email; e.g. to "test@st.com", and wait for a reply. At step 280 the subscriber receives an e-mail from the diagnostic unit. From this exchange of e-mail between the diagnostic unit and the subscriber additional information relating to the POP and SMTP configuration is obtained, as shown at step 290. At step 300 the subscriber's configuration is validated.

At the next step, step 310, the subscriber is provided with a session ID and a priority technical support number. The session ID is for tracking purposes within the ISP's trouble ticket system within the call center. The priority technical support number is used since the subscriber has previously used the diagnostic web site in an attempt to remedy his problem. This allows the subscriber to get immediate priority within the call center for resolution of the problem, either through the IVR/ACD option or by speaking directly with a technician.

At step 320 the DU terminates whatever connection it currently has e.g., a POP connection. At step 330, the results of the session are sent to the call center. Preferably the log becomes part of the trouble ticket which was previously assigned to the subscriber or becomes otherwise available as shown in step 340. Additionally, comparison of the subscriber configuration may be compared to a known good configuration and any mismatches are identified and included as part of the message sent to the call center.

At step 350 the subscriber calls the priority technical support number with the session ID. By this time the session log has been forwarded to the technician. At step 360 the technician, by way of the session log, guides the subscriber to resolve any configuration problems the subscriber has. At step 370, the problem has been resolved.

A further embodiment includes the DU acting as a temporary Internet Service Provider (ISP). In the instance where a subscriber has a pressing need to access the Internet but is otherwise unable to do so, the subscriber can establish a communications link with the DU through the Fault Tolerant Protocol stack of the DU. The DU can then provide access to the Internet for the subscriber. Thus, even though the subscriber is unable to access the Internet through conventional means due to the subscriber's PC being misconfigured, the subscriber is able to access the network through the DU, in order to address the pressing need of the subscriber.

Having described preferred embodiments, numerous alternative embodiments or variations might be made. For example, the DU 15 was described in terms of software instructions for hardware to perform operations. Due to the nature of software, the functionality of the software could be accomplished using hardware, firmware, hard wiring, or combination of these. Also, analysis functions could be performed in the DU 15. Further, the network 10 shown in FIG. 1 including the local loop is illustrative only and not limiting. Different networks are within the scope of the invention and the appended claims, including networks such as cable TV networks, that do not include a local loop. For example, a Hybrid Fiber Coax (HFC) system, or a wireless system can replace the local loop in FIG. 1. Therefore, the invention should be limited only by the spirit and scope of the appended claims.

What is claimed is:

1. A method of diagnosing a fault between a subscriber having a subscriber terminal and a network element adapted to receive messages of a first format, the method comprising:
    providing a diagnostic unit with a diagnostic website;
    receiving, through the diagnostic website with the diagnostic unit, a communication from a subscriber experiencing a problem communicating with the network element, the communication having a second format inconsistent with the first format;
    determining with said diagnostic unit fault information of said subscriber terminal from a format of said communication generated by the subscriber terminal; and
    communicating, with said diagnostic unit, with the network element in a format consistent with the first format.

2. The method of claim 1 wherein receiving a communication from a subscriber comprises utilizing a Fault Tolerant Protocol stack to allow communication between said subscriber and said diagnostic unit for diagnosis purposes when the subscriber terminal is unable to communicate with the network element.

3. The method of claim 2 wherein said Fault Tolerant Protocol stack permits communication with said subscriber when said subscriber terminal is misconfigured for communication over the network to the selected network element.

4. The method of claim 2 wherein receiving a communication from a subscriber further comprises providing communication with said network through said at least one Fault Tolerant Protocol stack in said diagnostic unit.

5. The method of claim 1 wherein the network comprises the internet and an access network managed by an internet service provider, and the diagnostic unit is installed within the access network and the network element is connected to the diagnostic unit through the internet.

6. The method of claim 1 additionally comprising forwarding the fault information electronically to a support operator.

7. The method of claim 1 additionally comprising obtaining an identification of said subscriber.

8. The method of claim 7 wherein obtaining an identification of said subscriber includes determining a username of said subscriber.

9. The method of claim 8 wherein obtaining an identification of said subscriber includes obtaining at least one of authentication information associated with said username, a phone number of said subscriber and a time stamp.

10. The method of claim 7 further comprising identifying said subscriber by said identification information within a trouble ticketing system of said service provider.

11. The method of claim 10 further comprising prioritizing said subscriber by said identification information within said trouble ticketing system of said service provider.

12. The method of claim 1 wherein determining fault information includes the step of emulating with said diagnostic unit at least one of login services to said subscriber and authentication services to said subscriber.

13. The method of claim 1 wherein determining fault information includes analyzing with said diagnostic unit the format of data sent by said subscriber.

14. The method of claim 1 wherein determining fault information includes the step of negotiating a protocol between said subscriber and said diagnostic unit, said protocol selected from the group consisting of modem training, network control protocols, authentication protocols, compression protocols and upper layer protocols.

15. The method of claim 1 wherein determining fault information includes authenticating a password supplied by said subscriber for an Internet Service Provider (ISP) Net.

16. The method of claim 1 wherein determining fault information further comprises:
    sending an e-mail to a diagnostic unit from said subscriber; and
    receiving an e-mail from said diagnostic unit by said subscriber.

17. The method of claim 1 wherein determining fault information includes emulating with said diagnostic unit e-mail services to said subscriber.

18. The method of claim 1 wherein determining fault information includes emulating with said diagnostic unit the Internet to said subscriber.

19. The method of claim 1 wherein the subscriber terminal comprises a DSL modem.

20. The method of claim 19 wherein the subscriber terminal further comprises a personal computer.

21. A method of providing network access for a subscriber comprising the steps of:
    providing a diagnostic unit in communication with a network;
    receiving, with said diagnostic unit, a communication from a subscriber unable to communicate with a desired network element;
    allowing communications between said subscriber and said diagnostic unit by accepting data from said subscriber in a source protocol inconsistent with a network element protocol of a selected network element; and
    establishing a communication link with the subscriber and sending an indication of the data received from the subscriber to the selected network element in a protocol consistent with the network element protocol.

22. The method of claim 21 wherein allowing communications comprises utilizing at least one fault tolerant protocol stack.

23. A diagnostic unit comprising:
    a processor in communication with a subscriber and with a network; and
    storage associated with said processor, said storage storing instructions for:
        causing said processor to receive data from said subscriber;
        determining configuration information of said subscriber;
        accepting data from said subscriber in a source protocol inconsistent with a network element protocol of a selected network element;
        establishing a communication link with the subscriber; and
        sending an indication of the data received from the subscriber to the selected network element in a protocol consistent with the network element protocol.

24. The diagnostic unit of claim 23 wherein said instructions further include instructions for causing said processor to forward said configuration information to a selected network element.

* * * * *